June 16, 1964   B. S. STAWINSKI   3,137,196
SHEET METAL NUT WITH SEALER ESCAPEMENT MEANS
Filed Aug. 26, 1960

INVENTOR.
Benjamin S. Stawinski
BY
E. W. Christen
ATTORNEY

3,137,196
SHEET METAL NUT WITH SEALER ESCAPEMENT MEANS

Benjamin S. Stawinski, Southfield, Mich., assignor to General Motors Corporation, Detroit, Mich., a corporation of Delaware
Filed Aug. 26, 1960, Ser. No. 52,201
1 Claim. (Cl. 85—32)

This invention relates to fastening installations and more particularly to a fastening installation utilizing a nut having a washer extending therefrom and a sealing material disposed between the washer and the parts to be joined.

In securing parts together it is often desirable to make use of nuts and threaded or unthreaded studs, such nuts being of the sheet metal or the usual solid type. In many installations, such as in automotive manufacture, it is desirable to secure two or more panels together, or to secure an object to a panel, in such a manner as to prevent the entry of dirt, water and other foreign materials through the necessary stud receiving apertures in the panels and to prevent the exposure of the panels to water or the like, leading to rust, corrosion and an unsightly appearance. In order to accomplish this result it is generally known to provide a sealing material between a combination nut and washer and the supporting panel in such a manner as to completely surround the aperture in the supporting panel by the sealing material.

One common form of installation is to utilize a nut and washer combination and a slab of sealing material disposed between the nut and the supporting panel. The commonly used nut is formed of sheet metal and is provided with an integral circular skirt or washer extending radially outwardly and downwardly from the bottom of the nut portion. Another type is a common solid nut with a skirt or washer secured thereto in some suitable manner. The amount of sealing material is sufficient to completely fill the nut and washer combination and to surround the aperture in the supporting panel. Numerous problems result from this type of installation. The main disadvantage is that the sealing material resists the force of the sheet metal nut and washer combination as it is advanced along the stud, causing either a false torque reading on the usual torque wrench, or causing the nut to strip the threads on the stud. If the nut is of the sheet metal type having a thread cutting or thread forming impression, and the stud with which the nut assembly is used is an unthreaded stud, there is a tendency to form a concentric ring in the stud by the thread forming or thread cutting impression rather than to form a helical thread along the shank of the stud. Obviously, this would prevent any movement or advancement of the nut along the stud in the direction of the supporting panel.

The device in which this invention is embodied comprises a nut and washer combination suitable for use in securing panels or objects to panels with a sealing material disposed therebetween. Suitable means are provided to permit the escape of excess sealing material as the nut and washer combination is advanced along the stud, relieving the pressure of the sealing material and preventing the aforementioned resistance to the tightening of the nut. Only the excess amount of sealer is permitted to escape, thus assuring a sealed installation to prevent the formation of rust and corrosion about the aperture in the supporting panel.

This device comprises generally a nut having a fluted skirt or washer extending outwardly therefrom and with sealer escapement ports formed by the raised portions of the flutes in the skirt or washer to permit the escape of sealing material.

These and other objects and advantages may become more apparent from the following description and drawings, in which.

Figure 1:
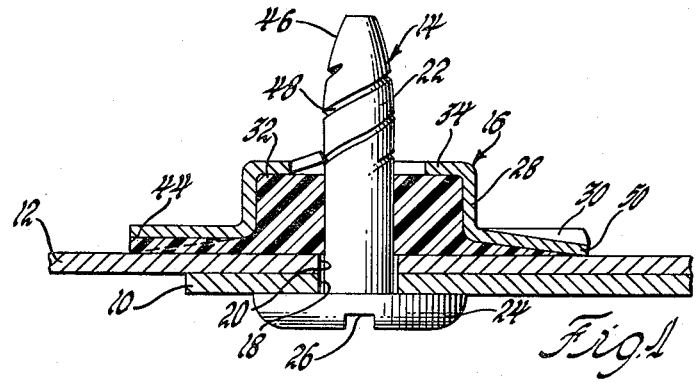
FIGURE 1 is an elevational view of a nut and stud installation with parts broken away and in section to illustrate the positions of the various parts.
Figure 2:
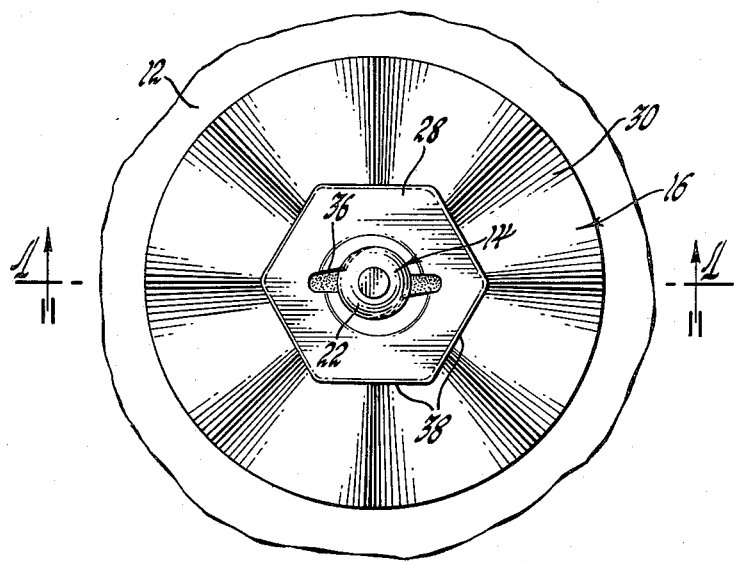
FIGURE 2 is a plan view of the installation illustrated in FIGURE 1 showing the position of the various parts.

Referring more particularly to the drawings, FIGURES 1 and 2 best illustrate the fastener installation. For ease in description two supporting panels 10 and 12 are shown secured together by means of a stud, illustrated generally by the numeral 14 and a sheet metal nut and washer combination, illustrated generally by the numeral 16. Panels 10 and 12 are provided with suitable apertures 18 and 20, respectively, through which the shank 22 of stud 14 is received. Stud 14 is provided with an enlarged head 24 which may have a suitable groove or opening 26 to permit the use of a screwdriver, or like tool, in the assembly of the installation. Stud 14 may be threaded or unthreaded in its original condition, depending on the type of nut and washer combination utilized in the installation. For ease in description, FIGURES 1 and 2 illustrate an unthreaded stud.

The nut and washer combination, illustrated generally by the numeral 16, is shown to be of the sheet metal type having an upper nut portion 28 and a skirt or washer 30 extending radially outwardly from the bottom of the nut portion 18. Disposed between the nut portion 18 and the supporting panel 12 is a suitable sealer material 32 which seals the apertures 18 and 20 in the supporting panels 10 and 12 and about the shank 22 of the stud 14.

Figure 3:
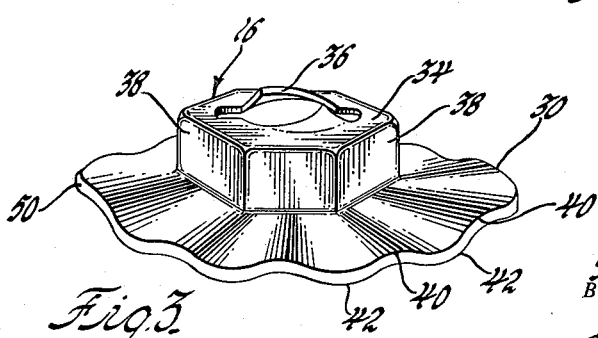
FIGURE 3 is an isometric view of the nut and washer combination illustrated in FIGURES 1 and 2.

Referring to FIGURE 3, the nut and washer assembly 16 is best illustrated. This shows a sheet metal nut having an upper surface 34 with a thread forming impression 36 formed therein. The impression 36 may be of any suitable type and may form the threads in the stud either by actually removing material and cutting a groove as the thread is formed, or by merely deforming the surface of the stud to provide a thread.

A plurality of side walls 38 extend downwardly from the upper surface 34 and in such a manner as to provide a polygonal shape to receive a standard wrench or the like, utilized with the nut and washer combination.

Extending from the lower edges of the side walls 38 is the skirt or washer portion 30 which extends radially outwardly from the nut portion 18. The skirt or washer is formed of a plurality of flutes, giving a scalloped effect to the outer edge of the washer. Alternate raised portions 40 and depressed portions 42 provide openings between the surface of the supporting panel 12 and the under surface of the exposed edge of the washer 30, as illustrated at 44 in FIGURE 1. It may be seen that these openings permit the escape of excess sealing material from under the nut and washer combination as the pressure of the sealing material is built up therebeneath.

The installation of the nut and washer combination on the stud is relatively simple. The stud is first placed in the apertures 18 and 20 in the supporting panels and the nut and washer combination 16 with the sealing material 32 disposed therein is placed over the reduced portion 46 of the stud 14. The sealing material may be provided with an aperture for ease in passage over the stud, but this is not essential. The nut and washer combination 16 is then rotated by any suitable means to form a thread 48 in the shank 22 of the stud 14. This causes the nut and washer combination 16 to advance along the shank 22 in the direction of the supporting panels 10 and 12.

As above stated, the pressure build-up of the sealing material 32 as the nut and washer combination is advanced instead of resisting the advancement of the nut and washer combination is relieved by the excess sealing material exuding from under the skirt or washer 30 at the openings 46 provided by the radial flutes. When the nut and washer combination is fully positioned with respect to the supporting panels 10 and 12, the sealing material will have completely filled any voids in and around the apertures 18 and 20 in the supporting panels and close the openings 40 formed by the flutes in the washer portion 30. This will provide a fluid tight and dirt tight installation and a secure fastening of the two panels 10 and 12 together.

The edge 50 of the skirt or washer 30 at the depressions 42 is angularly disposed with respect to the supporting panel and serves to cut off the excess sealer material that has exuded from under the nut and washer combination. This leaves a more sightly installation.

Thus, a fastening installation is provided which permits efficient sealing of the apertures in the parts to be joined and still provides an efficient and positive securement of the parts together.

What is claimed is:

A one piece sheet metal nut for use with a stud and a support, said nut comprising: an upper wall having a stud receiving and engaging impression including thread means formed therein and adapted to receive and retain said stud; a plurality of contiguous side walls extending substantially perpendicular from said upper wall and forming with said upper wall a polygonal hollow body; a continuous washer extending radially outwardly from and substantially perpendicular to said side walls, said washer consisting of alternately raised and depressed curved flutes extending radially from said side walls to the periphery of said washer throughout the entire circumferential extent of said washer so that every cross section of said washer in the radial direction is of arcuately corrugated configuration, said depressed flutes being inclined in a direction away from said upper wall, and a sealer material filling said hollow portions of said nut member prior to installation, said depressed flutes being adapted to engage said support and said raised flutes being adapted to be spaced from said support when said nut is finally positioned with respect to said support to permit the escape of excess sealer material from said hollow body.

References Cited in the file of this patent

UNITED STATES PATENTS

| | | |
|---|---|---|
| 1,172,669 | Caldwell | Feb. 22, 1916 |
| 1,878,425 | Olson | Sept. 20, 1932 |
| 2,181,631 | Tinnerman | Nov. 28, 1939 |
| 2,284,081 | Beggs | May 26, 1942 |
| 2,775,917 | Ferguson | Jan. 1, 1957 |
| 2,945,524 | Becker | July 19, 1960 |
| 3,086,421 | Hamman | Apr. 23, 1963 |

OTHER REFERENCES

Automotive Industries, vol. 115, page 141, Oct. 15, 1956.